United States Patent [19]
Farnam et al.

[11] 3,939,892
[45] Feb. 24, 1976

[54] MAKING INSULATOR GASKETS

[75] Inventors: Robert G. Farnam, New Lisbon; Michael T. Passarella, Wisconsin Rapids, both of Wis.

[73] Assignee: F. D. Farnam Co., Lyons, Ill.

[22] Filed: Aug. 20, 1973

[21] Appl. No.: 389,491

Related U.S. Application Data

[60] Division of Ser. No. 120,526, March 3, 1971, which is a continuation-in-part of Ser. No. 76,459, Sept. 29, 1970, Pat. No. 3,655,210, which is a continuation-in-part of Ser. No. 66,958, Aug. 26, 1970, abandoned.

[52] U.S. Cl. ............... 156/252; 156/265; 277/166
[51] Int. Cl.² ................... B32B 31/00; B65D 53/00
[58] Field of Search .......... 156/252, 256, 293, 295, 156/263, 264, 265; 277/207, 209, 233, 228, 235 B, 166, 227; 285/412, 368

[56] References Cited
UNITED STATES PATENTS

| | | | |
|---|---|---|---|
| 524,162 | 8/1894 | Cochrane | 277/233 |
| 1,241,587 | 10/1917 | Victor | 277/235 B |
| 1,593,325 | 7/1926 | Atwood | 277/233 |
| 1,939,492 | 12/1933 | Fisher et al. | 277/233 |
| 2,125,334 | 8/1938 | Dempsey | 277/233 |
| 2,136,734 | 5/1938 | Denman | 277/233 |
| 2,511,168 | 6/1950 | Martin et al. | 156/156–293 |
| 2,750,322 | 6/1956 | Cooke et al. | 277/227 |
| 3,231,288 | 1/1966 | Hensien | 277/166 |

*Primary Examiner*—Douglas J. Drummond
*Attorney, Agent, or Firm*—Mann, Brown & McWilliams

[57] ABSTRACT

Methods for forming heat-insulative gasket structures permitting the selective variance of components thereof whereby high torque retention, heat-insulative and fluid-tight sealing characteristics are obtained in an internal combustion engine between the intake manifold and the carburetor throttle body or between the carburetor throttle body and bowl. The method provides for densified and non-compressible bolt hole portions to be achieved by mechanical compression, provision for suitable insert members, or a combination of the two. Such portions provide desirable characteristics to control spring action and torque retention of the structures. The method also provides for formation of fluid-tight compressible sealing beads from the gasket material on one or both sides of the insulator member.

12 Claims, 14 Drawing Figures

MAKING INSULATOR GASKETS

This application is a division of our application Ser. No. 120,526, filed Mar. 3, 1971, which was a continuation-in-part of our application Ser. No. 76,459, filed Sept. 29, 1970 (now U.S. Pat. No. 3,655,210), which was a continuation-in-part of our application Ser. No. 66,958, filed Aug. 26, 1970 (now abandoned).

BACKGROUND OF THE INVENTION

Today's high-powered and sensitive internal combustion engines have produced unique carburetion problems. Since most modern cars have low silhouettes, insulation under the hood, and restricted air ventilation over the engine, the tendency for temperature build-up in the carburetor is substantially increased, particularly when the engine is turned off after normal car operation. If the heat build-up is enhanced through conduction from the intake manifold to the carburetor, the problem is even greater, and hence the need for adequate gasket insulation from the intake manifold to the carburetor throttle body, and in some cases from the throttle body to the fuel bowl.

Along with the need to insulate the carburetor from engine heat is the need to provide a structure that will also effect sealability between the respective flanged parts in which the insulating structure is used. Thus, where it is desired to use an insulating structure between the throttle body and the intake manifold, due regard must be given to the provision of fluid-tight seals at the juncture surfaces of these components. Along with the insulating and sealability requirements for the above described structure or member, it is necessary to impart to that structure high torque retention characteristics so that, through long periods of usage under service conditions, the components of the carburetor assemblage will remain in fluid-tight relationship or are capable of being put back into such condition even when one component is removed from the other during various periods of servicing. The insulating-sealing structure must also possess the ability to perform these essential functions without creating distortion in mating metal parts between which it is placed, the metal parts usually being soft ductile materials, such as aluminum or zinc. By distortion is meant that, when an insulating-sealing structure is used between opposed flanged members, the bolting of one member to another with the insulating-gasket structure therebetween, bowing, arcing or other uneven mating of the components will result. Many times a structure that is clamped between two others produces a so-called spring effect, tending to distort one or both of the mating surfaces of opposed members. Obviously, distortion is quite undesirable in that it breaks the fluid-tight engagement or seal between opposed mating surfaces, and may also cause actual breakage of the throttle body adjacent to the bolt holes. To meet the aforedescribed criteria and overcome undesirable conditions found in today's automotive environment is the subject matter of this invention.

The prior art has suggested the use of one or more members for effecting thermal insulation, fluid sealing, torque retention and minimization of distortion in the highly sensitive carburetor bowl assembly of an internal combustion engine. However, for the most part, these suggestions have been unable to meet and satisfy all of the requirements necessary to provide insulating and sealing qualities, while maintaining high torque retention. Where one problem was solved, an undesirable one offset it, and the selective and independent control of the variables intrinsic to the overall problem was not obtainable. It is now believed that a gasket heat-insulating structure is available meeting all of the criteria dictated for satisfactory use in the carburetor assemblage, all of which is attained within economically feasible boundaries.

SUMMARY OF THE INVENTION

This application is a division and continuation-in-part of our copending application Ser. No. 66,958 filed Aug. 26, 1970 for High Torque Retention Heat Insulator Gasket. The invention pertains to the methods for manufacturing insulator gasket structures of the type disclosed in our application Ser. No. 66,958 of Aug. 26, 1970, and our continuation-in-part application Ser. No. 76,459 of Sept. 29, 1970. The disclosures of these two applications are hereby incorporated herein by reference to the extent that they are not inconsistent with the present disclosure.

In an exemplary embodiment, this invention pertains to an automotive gasket-insulator structure comprising an at least two-component assembly of a first member of heat-insulative character and a second member of fluid-sealing character, wherein the first member defines peripheral portions adapted to encircle and be retained within the assemblage of use by retaining means such as bolts and the like, and wherein the density of these portions is substantially greater than the density of the remainder of either of the said members. More specifically, the invention pertains to a heat-insulative and fluid-sealing gasket structure comprising a heat-insulative member of selected thickness and configuration generally having a central opening and having a plurality of spaced bolt holes therethrough, the holes being peripherally spaced therearound. The bolt holes in one embodiment are larger than are necessary to accommodate the bolts and each has a non-metallic, generally congruent, annular insert member therein of high strength and low thermal conductivity so as to form a properly sized bolt hole. A layer of gasket material is positioned on at least one side of the heat-insulative member and generally is of the same configuration, and it may be secured to the heat-insulative member by an adhesive bond. A continuous sealing bead may be fashioned from a portion of one of the gasket layers inward of and around the central opening of the structure, and the sealing bead is of considerably less density than the remainder of the gasket layer from which it is formed, thereby lending considerable resilience and conformability to the sealing bead in order to aid and effect sealing of the carburetor assemblage in which the structure is used.

The bolt holes in another embodiment are sized to properly accommodate the bolts. The entire core is of the high strength and low thermal conductivity material used in the inserts referred to above. The material in the bolt hole area is raised from the general plane of the core and the layers of gasket material are positioned so that they extend no higher than the plane of the bolt holes. Sealing beads will generally be required when the gasket material is lower than the bolt holes to create a fluid tight seal and insulating air pockets.

DESCRIPTION OF THE PREFERRED EMBODIMENTS

Figures 1, 2, 3:
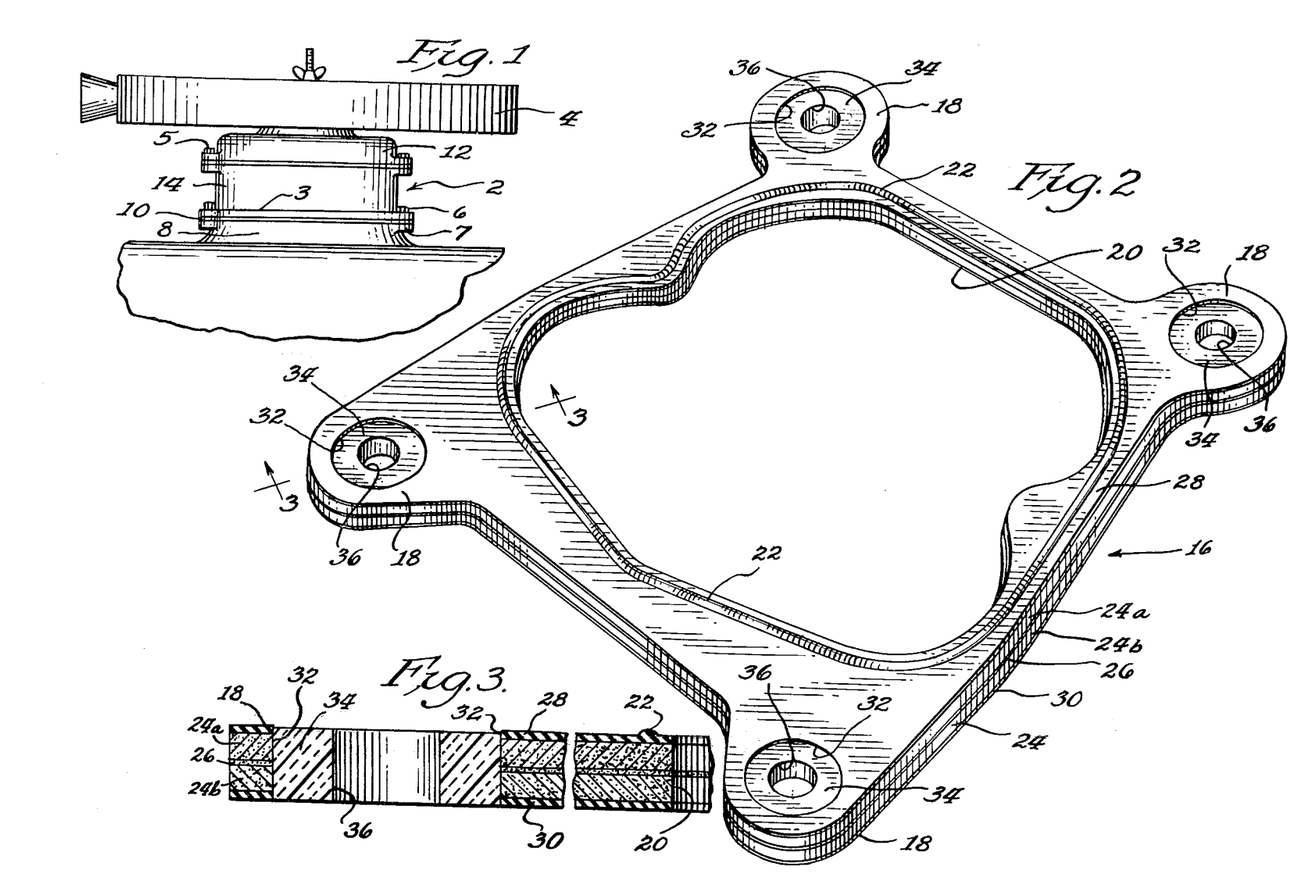
FIG. 1 is a schematic illustration of how the structures of this invention are used.
FIG. 2 is a perspective view of one of the embodiments of the invention as it might be applied to the FIG. 1 environment.
FIG. 3 is a fragmentary, sectional view in cross section taken along the lines 3—3 of FIG. 2.

Referring to the drawings wherein like numerals of reference will designate like elements throughout, and referring specifically to FIG. 1, the intended field of use for the inventive structures of this invention is illustrated. It will be noted that the conventionally-found carburetor assembly 2 having the usual air filter or horn 4 is secured by a wing nut to the carburetor bowl 12, which in turn is secured by bolts 5 to the throttle body 14, the latter being secured by bolts 6 to the intake manifold, as shown at 8. This is a very diagrammatic illustration but will serve the purposes to show that the heat-insulating gasket structure 10 of this invention is positioned between the flanged portions 3 and 7 of components 2 and 8, respectively, so as to prevent heat build-up from the remainder of the engine (not shown) in the sensitive carburetion area. By the provision of the structure 10, distortion of the flanged mating areas 3 and 7 of components 2 and 8 is substantially prevented; a high degree of torque retention is maintained; and last, but not least, effective fluid-tight sealing is obtained. This latter facet is important when considering the low vaporization temperatures of fuel hydrocarbons that are normally consumed in the operation of internal combustion engines.

Referring to FIG. 2, a preferred type of heat-insulating gasket structure that may be used in the particular environment shown in FIG. 1 is depicted (although it should be understood that the structures of this invention may also be used between the sensitive throttle body 14 and carburetor bowl 12). Here, heat-insulating gasket structure 16 has an outer configuration generally conforming to the size and shape of the flanged surfaces that it will be positioned between. It will be noted that there are spaced tab, ear or bolt hole portions, such as 18, and central aperture or opening 20 forming the interior of the structure. Spaced inwardly from bolt hole portions 18 and radially from central opening 20 is sealing bead 22, the specifics of which will be hereinafter detailed.

The heat-insulating gasket structure 16 is fabricated in this particular instance of a central core member or laminate 24, here illustrated as being composed of two thicknesses 24a and 24b being secured to one another by an adhesive bond layer such as 26. Laminate 24 may comprise a single or a plurality of individual laminae and should be of low thermal conductivity. A satisfactory type of material has been found to be a phenolic-resin impregnated vegetable fiberboard having on either side a congruently shaped gasket layer 28 and 30 of a suitable, conformable gasket material, the specifics of which will be detailed in the following commentary. Gasket layers 28 and 30 are adhered to elements 24a and 24b of laminnate 24 by an adhesive layer, omitted for purposes of clarity but similar to layer 26 between elements 24a and 24b.

Each of the bolt hole, ear or tab portions 18 is provided with an oversized hole or aperture, such as 32, within which annular reenforcing member 34 is firmly held by friction and/or chemical bonding. Member 34 is also provided with an aperture, such as 36, which forms a sized bolt hole opening to receive retaining bolts 6 to be used in the final assemblage to maintain the flanged components of the carburetor, with the gasket 16 therebetween in firm, rigid relationship. The specifics of member 34 will be described in detail later.

The bottom gasket layer 30 is essentially planar and coextensive with the laminated core member 24, but may, if found desirable, be provided with a sealing bead similar to bead 22 located on the upper planar surface of structure 16 and also being formed of the same material as gasket layer 28. While bead 22 is formed of the same material as gasket layer 28, it is of a less dense quality so as to be compressible or conformable in the carburetor assemblage. Sealing bead 22 may take any shape, depending upon the configuration of the two mating carburetor components between which gasket structure 16 is to be used, but generally, it will be continuous in form. In some instances, a similar type bead around the apertures 32 formed in tab portions 18 may be found to be desirable. Bead size and shape will be governed by specific end uses, but generally the bead may have a height within the range of about 0.005 – 0.015 inches, and in the preferred form will have a rounded cross section about 0.050 – 0.080 inches wide. Other heights and cross-sectional configurations are, of course, contemplated.

In the FIG. 2 embodiment the insert reenforcing member 34 is shown as a solid member of synthetic, non-metallic material, but it may also be, as will immediately become apparent, a laminated structure, a metal member, or one of solid molded character. A wide range of materials, sizes and shapes will also serve desired purposes.

Figure 4A:
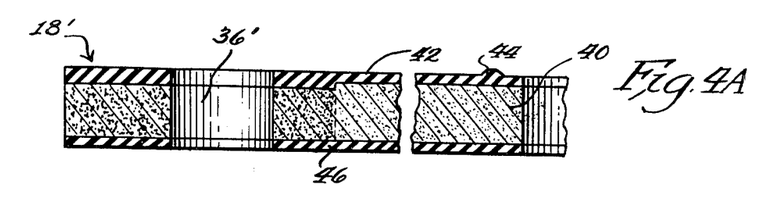
FIGS. 4A and 4B are fragmentary views in cross section illustrating various embodiments of the invention.
Figure 4B:
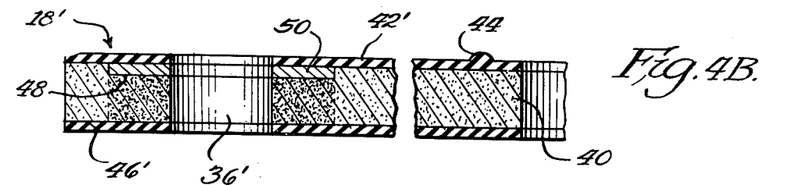

The embodiment of the invention just described is a preferred one, but there are other arrangements contemplated, and some of these are shown in FIGS. 4A and 4B. Referring specifically to these Figures, it will be noted that a heat-insulating member or core 40 is shown as fabricated of a single, unitary board, but again, it may be a laminated one as earlier described with two or more individual layers or components. For purposes of illustration, however, the central core 40 is illustrated as a single thickness comprising low thermal conductivity material such as resin-impregnated vegetable fiberboard of the type that is commercially available about 0.090 inch thick, but which is reduced, when densified, at the ear or tab portions about 0.015 inch as by coining or high pressure compression. The primary distinction in this embodiment is that bolt or tab portions 18' differ from those tab portions 18 shown in FIGS. 2 and 3. In each of the illustrations, a gasket layer is used on both top and bottom of the central core member 40, but it should be understood that only one such gasket layer with, or without sealing bead on either upper or bottom surface may be used under certain conditions.

Referring specifically now to FIG. 4A, a bolt hole tab portion 18' is shown as having a highly densified construction as indicated by the heavy cross-hatching. This extreme densification is obtained by pressing, coining, or otherwise decreasing the volume of the fiberboard 40 in the tab area 18' of the bolt hole opening. Upper gasket layer 42 is provided with a sealing bead, such as 44, of less density, and hence more conformability than the remainder of the surrounding gasket layer 42. It should be noted also that gasket layer 42 is of greater thickness in the area of the core densification and preferably has approximately the same density of the bead 44. Positioned on the bottom of core insulating board 40 is another gasket layer, such as 46, and is coextensive with the tab portion 18', and each of the gasket layers 42 and 46 may be secured to the core 40 by means of an adhesive bond layer omitted for purposes of clarity.

Referring now to FIG. 4B, a structure similar to that shown in FIG. 4A is depicted, with the exception that densification of the fiberboard core 40 in the area of the tab 18' is carried to an extent so as to form depression or recess 48 in the outermost portion of tab 18'. The gasket layers 42' and 46, as well as sealing bead 44, are the same as earlier described for the FIG. 4A embodiment, except that the gasket 42' is preferably of uniform thickness and density except for the bead 44. In order to obtain high torque retention and proper sealing when the unit is clamped between mating flanges of the carburetor assembly, an annular insert member or washer, such as 50, is fitted and press fitted or otherwise secured in recess 48. Obviously, because it is desired to cut down on heat transmission between metal components in which the structures of this invention are used, it is desirable to use a metal of low conductivity for insert 50, if a metal washer is to be used, but still preferred is a high density, highly compressed resin-impregnated asbestos fiber material or molded plastic material of low thermal conductivity.

Figure 5A:
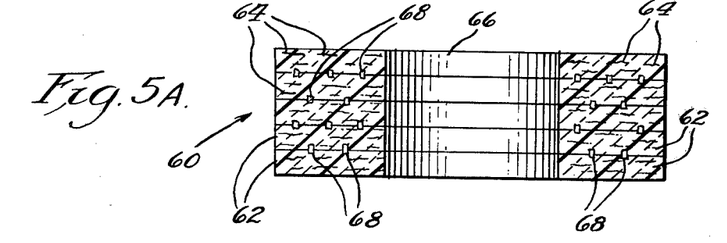
FIGS. 5A and 5B illustrate in somewhat exaggerated and simplified cross section a component of the structure depicted in FIG. 3.
Figure 5B:
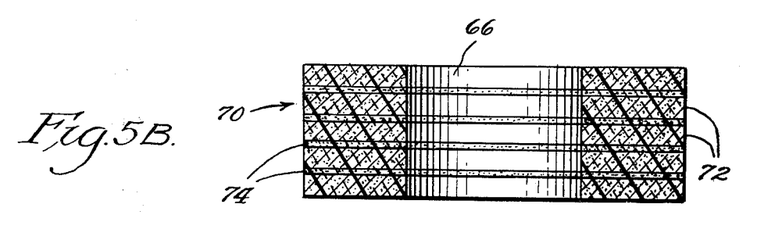

Referring now specifically to FIGS. 5A and 5B, a preferred mode of obtaining densification or high torque retention is by means of an insert of a type that may be used especially in the FIGS. 2, 3 and 4B embodiments of the invention. In FIG. 5A, the insert 60 is shown as comprising a plurality of laminae 62 of a thin, porous asbestos paper construction with long asbestos fibers 64 being laid perpendicularly to the longitudinal axis of the central aperture 66. In this particular structure, the individual lamina 62 are placed in a vertical stack and then subjected to a vacuum impregnation process, the impregnation utilizing a heat-resistant thermosetting resin such as the phenolic resins to form interconnecting links, such as 68, between the individual laminate layers 62. These links 68 are merely diagrammatically illustrated, and it is not intended to show in micro-photographic fashion the impregnated structure that would actually result after such impregnation process. Suffice it to say, however, that an annular or tubular laminate member 60 is formed having a multiplicity of interconnecting resin links, such as 68, and being totally encased by a layer of the same material on the outside and, indeed, the inside surfaces, such as shown. After the plurality of lamina 62 have been vacuum impregnated or otherwise interconnected with phenolic resin, the member 60 is highly compressed and densified to produce a member of high strength, good torque retention, and low heat or thermal conductivity.

The FIG. 5B embodiment shows another construction for an insert member 70, and such member is depicted as comprising a plurality of asbestos board lamina 72 which have been impregnated or dipped in a phenolic resin so as to saturate its pores and having adhesive phenolic resin layers 74 therebetween, and fabricated under high pressures to produce a highly compressed, densified mameber having similar characteristics as member 60 in FIG. 5A.

It should be understood that the products described in FIGS. 5A and 5B are suitably post-cured and are adapted for use for the insert 34 of FIG. 3 or the washer 50 of FIG. 4B.

A modified form of the invention is shown in FIGS. 6 through 9 inclusive, and in this embodiment of the invention the core, generally designated 85, is made from asbestos millboard and is essentially the same as the asbestos millboard used in the fabrication of the inserts 34 previously described. In this case, the core 85 is formed by taking two or more die-cut pieces 86 which have been suitably impregnated with the water-alcohol, phenolic resin mix, and placing them on a heated pin mold with a washerlike member 87 interposed therebetween (see FIG. 8), and flanked on their outer sides with die-cut gasket pieces 88 and 89. The core members 86 have openings 90 corresponding in diameter to the O.D. of the bolts that will be used for clamping the mating metal flanges together, and the washer member 87, which is also made of asbestos millboard and impregnated with the phenolic resin mix, has an interior opening 91 which also corresponds in diameter to that of the clamping bolts. The outer diameter of the washer 87 is roughly the same as that used for the inserts 34 in the embodiments of the invention shown in FIGS. 2 and 3, and the gasket material 88 and 89 may be the same as the gasket stock shown at 28 and 30 in FIGS. 2 and 3. The gaskets 88 and 89 are die-cut with openings 92 which are approximately the same diameter as the O.D. of the washers 87, so that when the gasket components are hot-pressed in the pin mold to form the finished gasket, the core 85 will be of substantially homogeneous character with protuberances 93 and 94 projecting through the openings 92 in the gasket stock, and with the density of the core substantially that of the inserts 34. After the hot-press formation of the composite gasket, it may be taken through final cure.

Figures 6, 7, 8, 9:
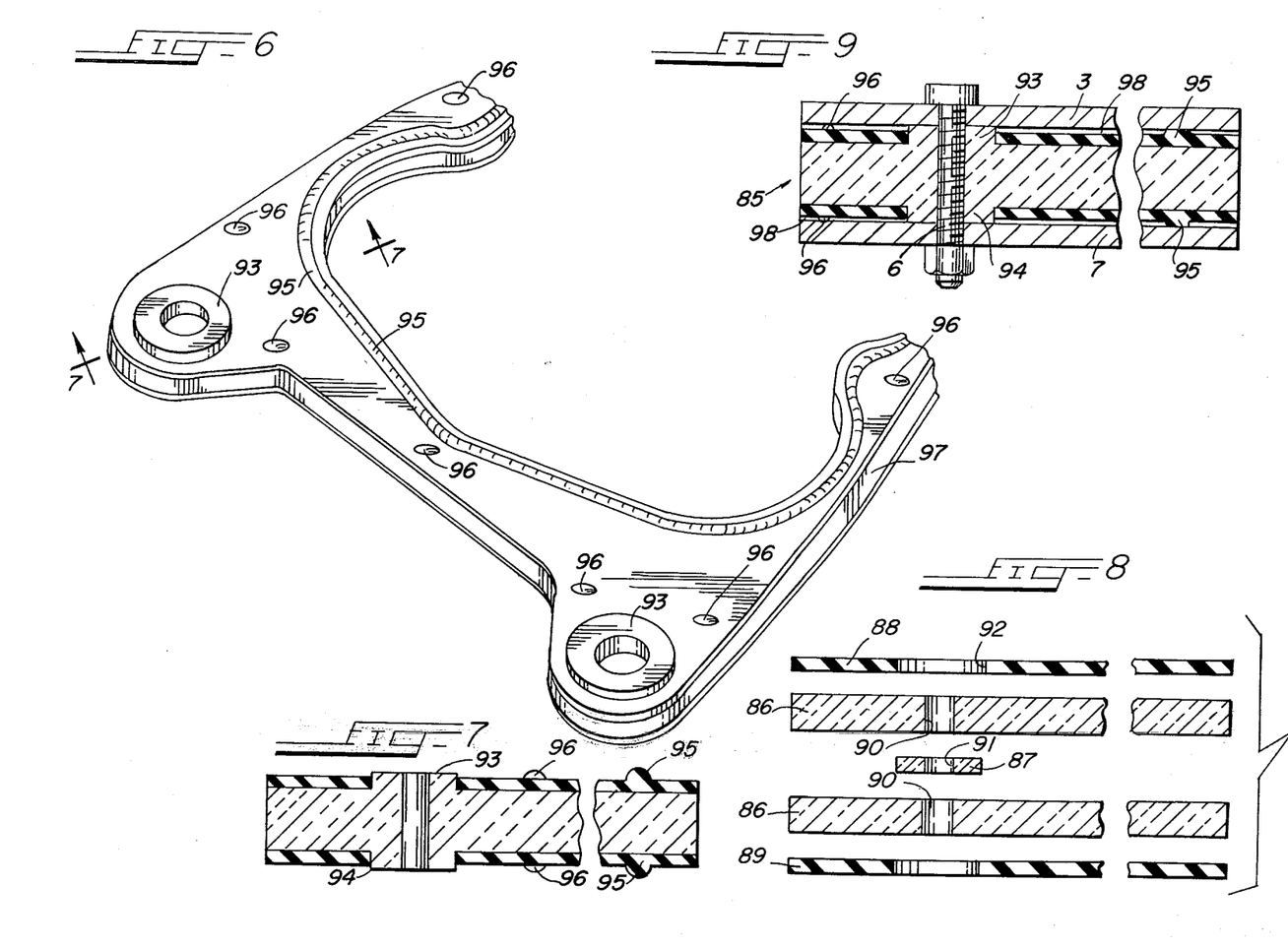
FIG. 6 is a perspective partial view of another one of the embodiments of the invention as it might be applied to the FIG. 1 environment.
FIG. 7 is a fragmentary, sectional view in cross section taken along the line 7—7 of FIG. 6.
FIG. 8 is a cross-sectional view showing the component parts of the sectional view in FIG. 7 before fabrication.
FIG. 9 is an illustration of the cross-sectional view of FIG. 7 in use in the FIG. 1 environment.

It will, of course, be understood that the core 85 and the gasket covers 88 and 89 are die-cut with the other openings that are necessary to form the configuration shown in FIG. 6 of the drawings.

Either or both of the gasket covers 88 and 89 have a continuous bead 95 formed on their outer faces during the compression of the mold, this being accomplished by grooves in the mold faces, as previously described. Also, in some instances it is desirable to form a number of small protuberances or buttons 96 adjacent to the edges of the gasket for a purpose that will be later described, these buttons being formed during the compression of the mold in the same manner that the bead 95 is formed.

The fundamental objective in forming a heat-insulating gasket in the manner just described is so that when the mating flanges 3 and 7 are clamped together by the bolts 6, as shown in FIGS. 1 and 9, the flanged areas 3 and 7 will bottom on the protuberances 93 and 94, respectively, thereby providing firm clamping together of the parts and high torque retention, with the bead 95 on one or both sides of the gasket providing the required sealing of the opening 97 from the atmosphere, and with an air space 98 formed between the metal flanges and the gasket structure. The buttons 96, when used, help to maintain that air space when the distance between the bolts and the character of the flanged areas are such that distortion could bottom the flanged areas on the main portion of the gasket structure. It has been found in tests that the heat transmission with a gasket of this type is substantially lessened when the mating faces 3 and 7 are not permitted to have face-to-face contact with the gasket coverings of the composite gasket, and that providing any type of air space, on the order of 0.010 of an inch or less, the insulating qualities of the composite gasket are substantially enhanced.

Although it is preferred to actually maintain an air space, such as 98, between the flanges and the composite gasket, some advantage is gained even when there is some face-to-face contact, as long as such face-to-face contact is not a truly pressure contact. It is for that reason that in this embodiment of the invention the outer faces of the gasket pieces 88 and 89 should be level with the outer faces of the protuberances 93 and 94, or below these protuberances, as distinguished from the embodiment of the invention shown in FIGS. 2 and 3 where it is intended that the cover stock 28 and 30 should be slightly compressed during the clamping of the parts together by the bolts.

Merely by way of specific illustration, and not by way of limitation, it has been found satisfactory to have the air space 98 on the order of from about 0.005 to 0.010 inch, with the free height of the sealing bead being from about 0.005 to about 0.007 inch greater than the designed air space, with the bead being compressed during the clamping action sufficiently to have the mating flanges 3 and 7 bottom on the protuberances 93 and 94 and provide the desired air space 98. The buttons 96, when used, might have a normal free height of approximately 0.002 to 0.004 inch less than the height of the bead, and would be slightly compressed during the clamping action to assure the desired air space. The bead 95 is formed in the same manner as the bead 22 of FIGS. 2 and 3, and has lesser density than the main body of the cover stock when the gasket is formed, as previously described.

For some installations, it may be desirable to use in place of the buttons 96 a continuous bead running around the peripheral margin of the composite gasket and being located perhaps ⅛ inch inwardly of the peripheral margin. This bead would be formed in the same manner as the bead 95, but would have a height corresponding to that prescribed for the buttons 96 and would serve, not only as a limiting abutment to assure the air space remote from the clamping bolts, but also to seal the exposed faces of the gasket material from the elements and preserve the life of the gasket.

It should be understood that although it is preferred to have the core 85 made of asbestos millboard in the manner that has just been described, it is also possible to use the core structure disclosed in the FIGS. 2 and 3 embodiment of the invention, with the inserts 34 being sized so that they are either flush with the covers 28 and 30 or slightly above their level in order to obtain the desired improvement in heat insulating properties.

When the inserts 34 are above the level of the cover stock, or when the protuberances 93 and 94 are above such level, the need for the buttons 96 is lessened, and in most instances eliminated.

THE CORE OR INSULATING MEMBER

Because it is highly desirable to provide suitable insulation between carburetor components as referred to herein, the thickness of the insulating member will be dictated by space requirements and structural characteristics of the carburetor as well as the temperatures developed in the carburetor area. Generally speaking, the insulator member may be one having a low heat conductivity and will have a $k$ value of approximately 1.0 – 1.2, but this will vary depending upon other factors. Generally speaking, the insulating member may be made up of one or more layers or laminae depending upon space and other requirements and the form in which the insulative materials are commercially available. The materials of construction for the insulative or core member may be any of those presently regarded in the art as meeting the afore-defined requirements. Materials contemplated include the well-known synthetic materials, but because of economic factors, a resin reenforcced vegetable or similar fiberboard is both practical and economical. Generally, such materials may be described as semi-porous fiberboard reenforced with thermo-setting resin. In some of the illustrated specific embodiments, particularly where portions of the board are to be densified or materially compressed, compressibility of the core or insulator member becomes important. Generally speaking, the thickness that the insulator member may take will, as earlier indicated, be dictated by other considerations, but in the specific embodiments disclosed a fiberboard core of about 0.030 – 0.125 inch thick will be most practical. Because a material, such as fiberboard, reenforced with thermosetting resin, is compressible, its torque retention capability will be relatively low, somewhere on the order of 40% to 50%, measured at a 250° F temperature using an ASTM, F 38, Method B test for a 0.125 inch thick core; thus, the need for densification in the bolt hole portion, or the alternate use of an insert of one type or another as previously disclosed, is highly desirable. Due regard for thickness reduction where densification of the core itself is contemplated is necessary, such reduction being typically in the range of about 0.015 inch.

When the structure is of the character where the only compressibility is with the sealing bead and the bolt hole members are to take virtually all flange pressure, the core structure can be manufactured from a water-alcohol, phenolic resin reenforced asbestos millboard. It is substantially non-compressible and has a very high torque retention capacity — on the order of 75% to 85%. The $k$ factor of this material is on the order of 2.0 to 2.5. This higher $k$ factor is acceptable because the reduced area of surface to surface contact lowers the total heat transference.

THE GASKET LAYERS

In general, the materials contemplated in order to perform the fluid-tight sealing function in the structures of this invention are those materials commonly used in the gasket art because these materials have proven themselves in service to be able to withstand the rigors of service conditions generally found in carburetor environments. Typical such gasket materials are those made in accord with the teachings of Kao Pat. No. 2,676,099, issued Apr. 20, 1954. A satisfactory type of gasket material has been one found to be using a mineral fiber and cured nitrile rubber. Such material is available from the F. D. Farnam Co. under the trade name "Kaobestos 66015." Other gasket materials and the like may be used, as disclosed in U.S. Pat. No. to Farnam et al., 3,158,626. Other materials for other applications are also contemplated. Typical thicknesses of suitable materials will be within the range of about 0.020 inch which will be reduced or compressed to about 0.015 inch during bonding thereof to the core.

Generally speaking, however, the gasket materials should be of elastomeric material so as to be easily compressible in order to achieve fluid-tight sealing under light clamp loads, and generally should be those that are rather resilient, or "bulked", that is, somewhat light in density so as to be capable of being compressed to form. Where desired, a sealing bead of sufficient size may be provided to contribute to the sealing function. Also, because it is desired to fashion a structure which will provide fluid sealing, the gasket layer or layers should be conformable enough to take up the differences in mating tolerances generally found in carburetor components, and also be of a material which has low heat transmissibility.

A sealing bead, in order to effect efficient fluidtight sealing, may be formed during the sandwiching or molding process of the insulating gasket structures of this invention. The bead may be formed on one or both gasket layers, although it has been found that the utilization of a sealing bead on the upper gasket layer will normally suffice. This bead may take many configurations, but generally, one having a rounded crosssectional shape of a height of about 0.005 – 0.015 inch and a cross section width of about 0.050 – 0.080 inch has been found to be satisfactory. Although 0.005 – 0.015 inch is the general range, a preferred range is about 0.011 inch to about 0.014 inch for the bead height. Further, while 0.005 – 0.015 inch is a general range in those embodiments of the invention which do not provide the air gap 98, the range does extend upwardly to as much as about 0.060 inch where the air gap feature is to be used. When the bead is formed of the same material as the gasket layer adjacent thereto, the density thereof will be much less than that of the surrounding gasket material for the reason that it is not compressed as much during the molding or pressing process as the gasket material layer adjacent thereto. This, then, provides a conformable or resilient protuberance or projection in order to permit satisfactory sealing.

An adhesive bond layer is contemplated for securing both upper and, where used, bottom gasket layer to the core or insulating member, and types of adhesives and the like that may be used may vary considerably just so long as they are capable of forming an effective bond and will not deteriorate under the service conditions contemplated for the structures of this invention. Generally, the neoprenes have been found to be capable of forming effective bonds, and the addition of phenolic resins to some of these formulations has also been found to be effective. A preferred type of adhesive is a phenolic resin and neoprene combination which is thermosetting at a temperature of about 325° – 350° F. It is preferred that the adhesive layer bond between the insulating member and gasket layer or layers be only that thickness necessary to form an effective bond and no more. Where applied, the bonding material layer should not exceed approximately 0.0003 – 0.0007 inch at any one layer. A controlled thin bond line is desired to avoid the introduction of too thick a bond line, thus introducing additional torque loss problems or possible bond line flow and consistent with use of a bond material that must be somewhat conformable since the gasket is tightly clamped when applied. These same types of materials may also be used to form the adhesive bond between individual lamina of the core or insulating member where it is desired to build up and have a core insulator of a thickness greater than can be made from commercially available stocks.

There are a number of elastomer-resin compositions available, each of which has specific advantages. It is only important that the adhesive be capable of being applied as a continuous thin layer and that it be such that it can be dried or partially cured for easy handling prior to the final assemblage of the structures of this invention, and that it also be capable upon final or ultimate curing of producing a bond between adjacent laminae of the core member or between the core member and one or more gasket layers that will withstand the environmental conditions found in a carburetor assemblage. The types of elastomer compositions found desirable may be those disclosed in Farnam Et Al. U.S. Pat. No. 3,158,626.

AREA DENSIFICATION

As briefly alluded to hereinbefore, in order to maximize the attributes of the structures of this invention, and to have high torque retention, several means are available for achieving the desired end results. One such way has been previously mentioned, i.e., area densification of the insulator member itself at the area of the bolt holes, as shown in FIG. 4A. Another means of achieving substantially the same results is by densifying this area to the extent that a recess is formed within which an annular or tubular insert member may be positioned (see FIG. 4B) with or without a gasket layer covering, and the member may be of metal, solid molded plastic, or fabricated from phenolic resin-impregnated laminations of asbestos paper, asbestos board and similar such materials. Also, the members, inserts or the like, when made of metal may be very similar to bushings, washers, and similar such structures, and will be fabricated of steel and similar such metals of preferably low heat conductivity or $k$ value. Any of the insert members may run half the thickness, three-quarters of the thickness, or greater than the entire thickness of the finished insulator-gasket structure which generally will be about 0.115 – 0.120 inch in thickness but may vary in the range of from about 0.03125 inch upwardly to about 0.625 inch. In a preferred embodiment, an insert member of asbestos lamina is placed in an oversized bolt hole and retained therein in friction-fit manner and extends about the entire thickness of the finished structure, but in the fabricating process it is of slightly less thickness, say about 0.005 inch, to thereby act as a limiting compression factor in the gasket-insulator structure itself. For instance, because the materials of construction are compressible in nature and an insert member either of metal or highly densified asbestos phenolic resin-impregnated asbestos is substantially unyielding in comparison, the insertion of such a member prior to the actual volume reduction, compression or molding of the overall structure will limit the extent to which the overall structure may be compressed. More specific details of this aspect will be delved into under manufacturing techniques.

In the preferred embodiment, however, where a separate non-metallic insert is utilized, the insert comprises a plurality of layers of asbestos paper or asbestos millboard which has been saturated or impregnated with a thermosetting phenolic resin. Preferably, the number of laminations is kept to a minimum, but this will generally be dictated by the thickness or height of the insert that will be used in the particular insulator-gasket structure. The heat-resistant thermosetting, phenolic resin provides the necessary strength and torque retention, and in a preferred form, the fibers (where asbestos paper or asbestos fiberboard is used) have relatively long lengths and are laid at right angles to the clamping force, or, in other words, are normal to the longitudinal axis of the bolt hole which the insert, itself, forms. Other nonmetallic fibers will also perform satisfactorily. When a lamination has been built up, it will be subjected to a pressing operation which will materially reduce the thickness to as great as 40% and more of its original thickness, thereby producing a highly compressed and dense non-metallic insert which may be subjected to a curing step to insure total curing step to insure total curing of the phenolic resin or other material used in fabricating the insert. The dry weight of a phenolic resin impregnated asbestos millboard, for example, will show that the dry resin component is about 25% of the completed material.

The preferred non-metallic inserts of the invention using the phenolic asbestos combination will normally have a finished density on the order of 110 to 120 pounds per cubic foot, a thermal conductivity or $k$ factor of approximately 2 to 2.5, or thereabouts, (as compared to about 50 for steel), a phenolic resin content of about 25 percent by weight, and will show a high compression strength and chemical resistance to the environment in which the insulator gasket structures will be used. Proper high temperature cure insures that the inserts will maintain high torque retention values on the order of 90 to 95 percent at high clamp loads and elevated temperature. The inserts will preferably be able to take a torque load of approximately 15,000 to 20,000 pounds per square inch without fracture.

In another preferred embodiment, the bolt hole areas of the insulator gasket structure are densified by means of a washer of the same phenolic resin impregnated asbestos millboard as the core members between which it is inserted and pressed. The less dense gasket cover stock covers the core member only to a height no greater than that in the bolt hole areas.

FABRICATION TECHNIQUES

Keeping in mind the materials used in the insulator-gaskets of this invention, a more comprehensive understanding of the exemplary methods of fabricating the overall structures may now be had, taken in conjunction with earlier alluded to manufacturing techniques.

In the following example, it will be assumed that a structure having a double lamina core with top and bottom gasket material layers is desired. Suitable cover stock, generally of a slightly bulkier nature than is usual (especially where a sealing bead is to be formed), is cut to an appropriate width, this width being dictated by the width of the core or heat-insulating member. In some instances, however, even the commercially available resin-impregnated vegetable fiberboard will have to be cut to size, and thus the size will be dictated by the configuration of the ultimate insulator-gasket structure to be formed. After appropriate sizing of, for instance, a gasket layer and the heat-insulating member board, a first laminate is formed by taking a continuous roll of cover stock, and laminating it with an adhesive bond material to a sheet of core material approximately 90 inches long and one-half the final core thickness, with periodic cutting off from the continuous roll of cover stock to form a plurality of gasket covered core sheets. Thereafter, the panels will be coated on the side opposite the cover stock with a thin coating of elastomer-resin adhesive and then allowed to dry. After suitable drying, the thusly gasket-layered panels may be laminated to one another to form a second laminate by means of the adhesive layer and cut into appropriate widths.

The second or final laminate may then be die-cut into the ultimate structure configuration that is intended with oversized bolt hole openings which will later receive non-metallic inserts in order to form properly sized bolt hole openings. Depending upon the total thickness of the insulator-gasket structure, it may be from two layers of core board, or one layer of core board, or more than two layers. If there are more than two layers, the inner layers of the core board will also be coated on either side with a thin layer of adhesive as just described.

The thickness range of the bonding material requires some control so that it will not exceed approximately 0.0003 – 0.0007 inch at any one layer. Double this thickness would occur where two coated surfaces are brought together.

Next, the sandwich or assemblage is subjected to a hot pressing operation in a pin mold, the upper mold being provided with a groove to ultimately fashion the sealing bead in the upper gasket cover stock. Before initiation of the hot pressing operation, however, it is desirable to insert the non-metallic bushings or inserts which will act as a sizing means for the over-all thickness of the final structure, since they are relatively non-compressible in relation to the remainder of the structure. This permits the production of structures of this invention to very close thickness tolerances. Obviously, where warranted, these inserts may be placed in position after the hot-pressing operation. During the hot-pressing operation, the sandwich of members is considerably reduced in thickness, and hence, the inserts may be slightly less in height than the intended overall thickness of the ultimate structure (as indicated at 32 in FIG. 3) to thereby insure a properly sized insulator-gasket member. The bead is best formed by means of a groove in the upper mold half, and by bulking both the cover stock and the core slightly (within the range of 5% – 10%), and then bringing the assemblage to full density during the pressing operation, which procedure produces a conformable bead and which provides for ease of forming the bead. Where it is contemplated that the insulating member, itself, be densified in the area of the bolt holes, this is accomplished by building up those portions, and thereafter densifying to a much greater extent than would be the case where the member itself was not to be densified. The formation of a recess with partial densification and insertion of a metallic or non-metallic partial insert may, of course, be accomplished at the same pressing step, as will be apparent from the drawings. Suffice it to say, however, that the insertion of insert elements, where contemplated, may be subsequent to the entire pressing step, or it may be before or at the time of the mold pressing operation. The hot pressing is carried out over a dwell time, depending upon the thickness in the area of the bond line, at a temperature sufficient to cure, set, or otherwise insure bonding of all the members making up the structure. Obviously, where an epoxy resin-type bonding material or adhesive is contemplated, it may not be necessary to hot-press or to carry on curing at an elevated temperature, since such systems normally involve a curing agent or catalyst not requiring heat, pressure, etc.

Thereafter, the insulator-gasket structure may be subjected to a post-cure, if required, and the insert member 34 may then be pressed into position, if not already there. This positioning may be done by hand, semi-automatically, etc., and these as well as other modifications, depending upon the structures involved, will at once make themselves apparent when considering the materials employed and the desired results to be achieved.

In an alternative procedure, the non-metallic washers 70 are made from asbestos millboard having long asbestos fibers with preferably no organic binder and made at the low end of density within the limits of the bond as manufactured. The board, preferably, is of the lowest possible density consistent with the bonding strength of the non-organic binder used. This millboard is selected to have a thickness compatible to precision die-cutting without chipping or forming rough surfaces. Sheets of millboard are shear cut to a size convenient for use with gang dies. The cut sheets are placed in a chamber which is evacuated and then filled with a water alcohol mixture of phenolic resin. The chamber is then drained and the sheets are permitted to drip for a short while. The sheets are then dried. An example of drying time for a 0.200 inch thick board is from about 48 hours at room temperature to about three hours at 140°F. This drying does not effect a cure of the resin in the sheets. The impregnated sheets may then be stored at low temperatures (from 30° to 50°F.) to prevent air curing. It has been found the impregnated sheets stored at 40°F. have a shelf life in excess of 6 months. The impregnated sheets are removed from storage only at the rate of consumption in making washers or inserts. The resin content of these dried sheets is from 10% to 30% by weight of the sheets, ordinarily within 20% to 25% of such weight. The phenolic resin impregnated asbestos millboard has the consistency of firm leather when it is ready for die-cutting. The sheets of impregnated millboard are die-cut with gang dies to produce annular washer sections.

The finished washers or inserts can be fabricated in two ways. First, the annular washer sections can be put into a conventional compression mold that compresses the material into a cavity with a suitably sized pin to form the i.d. and with stops to set the thickness. There is a slight lateral flow of the material under high compression and heat in the range of 325° to 350°F. The thermosetting resin softens momentarily to become very tacky, and then hardens. The time in the mold, called dwell time, will vary with the thickness and volume of the individual washer. A dwell time of five to ten minutes will produce a finished part, but not with suitable economics. Using a shortened dwell time, of say 30 seconds to 2 minutes, will produce hardened parts which are then subjected to curing in a forced air oven at about 350°F. for three to seven hours. In following this procedure, care is exercised as to time and temperature to avoid over-cure of the gasket core material or cover stock. With either of these procedures, the part gains its ultimate properties, such as torque retention, crush and heat resistance, deflection resistance, fuel, oil and water resistance, etc. The compression of the washer in the gasket produces a bond that can withstand a push-out force in excess of five hundred pounds.

In using prefabricated washers or insert members, regardless of whether they are laminates or unitary members, it is difficult to maintain tolerances between an extremely hard and dense insert member and a relatively soft and compressible insulator gasket structure when indexing these inserts into the insulator gasket structures.

Figures 10A, 10B:
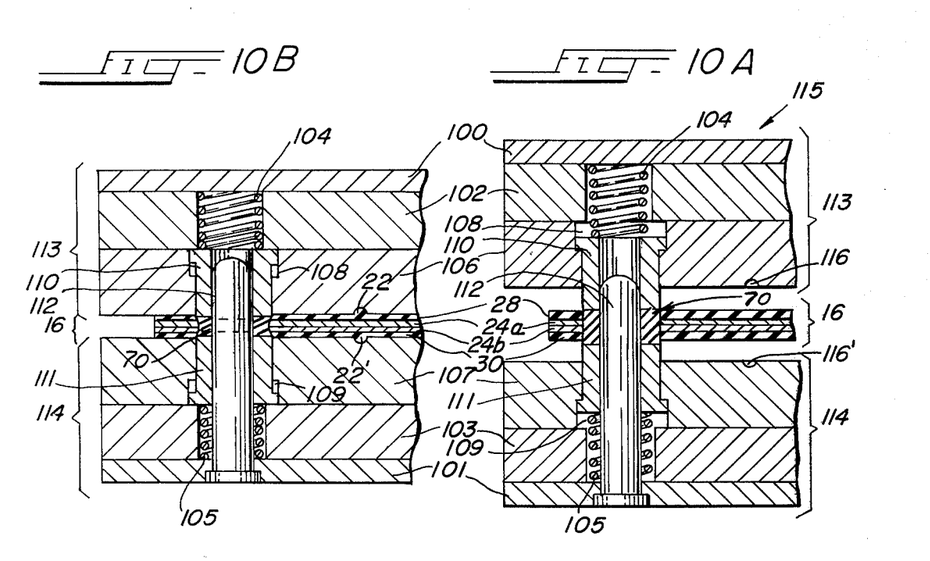
FIGS. 10A and 10B are fragmentary, sectional views of an apparatus for fabricating the structures of FIG. 2 taken along line 3—3 of FIG. 2.

It is, therefore, anticipated that an alternative procedure, as illustrated in FIGS. 10A and 10B, for the single step fabrication of the heat-insulative gasket structures will be used in most cases of production of the gasket structures of FIG. 2. Here, the component parts of the gasket structure 16 are shown, consisting of top gasket layer 28, the insulator core members 24a and 24b, and the bottom gasket layer 30. The illustrated structure 16 is provided with the top sealing bead 22 and the bottom sealing bead 22'. The annular washer sections (discussed above) of asbestos millboard are placed in the vicinity of the oversized bolt hole apertures 32. Upon completion of the structure, the washer sections become a laminated insert such as 70 in FIG. 5B. The entire insulation gasket is formed in a single hot press operation with the bushing material being densified simultaneously with the compression of the core material to its final dimension to obtain the proper thickness in relation to that of the bushing. This affords a simplified method of curing the bushing in conjunction with its manufacture as a part of the whole and minimizes handling.

The pin mold 115, illustrated as open in FIG. 10A and as closed in FIG. 10B, consists of an upper mold half generally designated 113 and a lower mold half generally designated 114. The upper mold half has the following components: a back up plate 100, a spring retainer plate 102, a high compression spring 104 located in the spring retainer plate, and a mold plate 106 into which a cavity 108 is machined with concentric bores. A top setting plug 110 is adapted to travel in the cavity 108 against the force of spring 104. A groove 116 is machined into the face of mold plate 106 to form the sealing bead 22 in the gasket cover stock layer 28.

The lower mold half 114 is constructed in a similar manner. Its components are a back up plate and pin retainer 101, a spring retainer plate 103, a high compression spring 105 located in the spring retainer plate, a mold plate 107 into which a cavity 109 is machined with concentric bores, and a pin 112 secured to the back-up plate and spring retainer which runs vertically through the mold. A bottom setting plug 111 is adapted to travel in the cavity 109 against the force of spring 105. A groove 116' is machined into the face of mold plate 107 to form sealing bead 22' in the gasket cover stock layer 30.

As illustrated in FIG. 10A, when the pin mold is in an open position immediately prior to the hot pressing, the setting plugs 110 and 111 protrude from mold plates 106 and 107, respectively, since the high compression springs 104 and 105 can fully expand to force the flanges of the setting plugs to seat at the terminal of the larger bores in the cavities 108 and 109. The initial contact with the insulator gasket structure is made by the setting plug faces meeting the laminates of insert 70. The insert 70 is loosely in place with respect to the rest of the insulator gasket members and at this time is approximately 160% of its final thickness when compressed. Pin 112 makes gentle contact with the interior of the insert member 70.

Upon compression, the pin mold and insulator gasket structure will attain a configuration, as is illustrated in FIG. 10B. The bushing distorts slightly, taking an irregular shape where it joins the body of the gasket, as shown in FIG. 10B. In this figure, the illustration indicates the lateral flow of the insert but, due to the small scale of this drawing, it has not been attempted to show the irregular shape in specific detail. During closing of the mold the following events occur: the setting plugs compress the insert against the force of the high compression springs, the setting plugs come to rest on the spring retainer plates, the pin 112 serves to size the interior aperture of the insert, the phenolic resin and solid material of the insert tends to be laterally squeezed into the surrounding insulator gasket members, the gasket layers are compressed somewhat, and the sealing beads are formed by being squeezed into the grooves 116 and 116'. Stops (not illustrated) are provided to limit the final compression of the mold. Equal sized setting plugs will produce a completed structure with the insert centered with respect to the remainder of the structure. By increasing the height of the top plug and decreasing the height of the bottom plug, the insert would be offset to a position below center. Other variations will become apparent when it is desired to maintain the insert in a particular position above or below center.

The compression of the insert members, which takes place at temperatures of 150° to 350°F. for a period of 5 to 10 seconds, provides improved bonding. This bonding is a result of the material of the insert members being laterally forced to flow in a plane normal to that of the compressive force. This causes the densified inserts to be mechanically forced into the adjacent portions of the insulator gasket structure. Chemical bonding also occurs because the thermo-setting resin in the insert members is also squeezed into the adjoining gasket areas and is cured. The insert members become integral with the insulator gasket structures being both mechanically and chemically united. This method is advantageous because the adjoining materials are in effect made as one and the bond achieved is far more effective than could be achieved with a preformed insert and an adhesive due to the relative compressibility of the structure before pressing, and because of the economics of eliminating one step from the process. This single step process permits densification in three discrete areas. The relative thicknesses of the insulating bushing and adjacent gasket body portions are more readily controlled and the lateral squeezing of the bushing material outwardly tends to firmly lock the bushing within the gasket body since the bushing tends to spread somewhat at the top and bottom thus forming annular flared edges which interlock with the core. The insert members are highly densified with little tendency to return to their original free height of 160% of their completed height when compressed. The great bulk of the elastomeric gasket cover stock is densified by the mold faces. The attendant heat tends to set them up in a compressed state, although far less dense than the inserts. The sealing beads are of still lesser density because the grooves in the mold faces let the elastomeric material flow to fill them, and thus subject the material to less compression.

The pressing time of the composite structures can be from 2½ minutes at 250°F to 15 seconds at 350°F. While this is sufficient for most of the heat insulator gasket structure, and, indeed, a longer pressing time would be detrimental to the gasket cover stock, it is to be realized that the inserts have only a partial cure.

Figure 11:
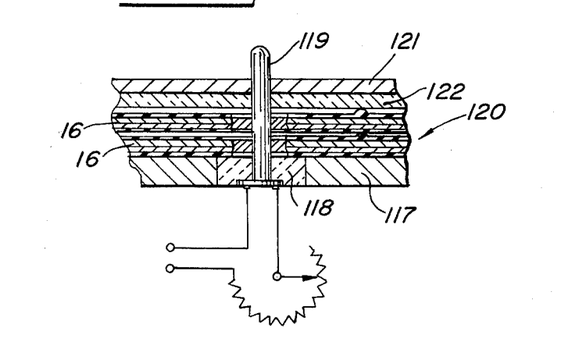
FIG. 11 is a fragmentary, sectional view of an apparatus for curing the structures of FIG. 2 taken along line 3—3 of FIG. 2.

Upon removal from the pin mold 115, the pressed gasket structures 16 are immediately placed in a stacking fashion over the pins 119 of a heated pin jig 120, illustrated in FIG. 11 crosssectionally along line 3—3 of FIG. 2. The bottom plate 117 of this apparatus is provided with heat-insulative areas 118 from which the pins designated 119 rise. Heating elements, such as Calrod units are provided in the pins. A top plate 121 having an insulator pad 122 is desirable in order to prevent heat dissipation from the insert members. The low thermal conductivity of the inserts impedes the flow of the heat of curing toward the heat insulator core and gasket cover and thus prevents any charring or disintegration of the heat insulator core or gasket cover. An effective heat barrier exists at the juncture of the heat insulator core with the insert member because the thermal conductivity of the core is approximately one-half that of the insert member. Virtually no heat passes into the core from the insert member. The pins may be from six to twelve inches high to accommodate many finished parts. Rheostats may be used to control the temperature of the heater elements in attaining the desired final cure of the insulator bushing and which may be started at approximately 275°F. to degas the material and then raised to 300° to 375°F. to insure complete cure without injuring other portions of the gasket. The cure time may be 1½ to 5 minutes, depending on the thickness and the volume of the inserts.

The sealing beads on opposite faces of the gasket may be omitted and in this event the height of the less dense main body of the gasket will be greater than the height of the relatively denser bushing whereby to obtain the sealing function when compressed between the carburetor mounting areas. The core material may be made sufficiently conformable so that sealing may be obtained without utilizing the beads, or the gasket covers, or the elastomeric coating on the core.

In another alternate procedure, it will be assumed that a structure having a non-compressible core with top and bottom gasket layers is desired. Suitable cover stock, as used above, is cut to size, the size being dictated by the size of the core or heat sealing member. The phenolic resin impregnated asebestos millboard sections 86 and washers 87 are cut to size. The cover stock 88 and 89 has an adhesive bond to adhere it to the millboard members. The components are assembled in the general manner of gasket material, core section, core washer, core section, and gasket material. This sandwich is then subjected to hot pressing in a pin mold, the mold halves being provided with recesses to permit the formation of raised bolt hole portions, and with appropriate grooves to provide desired sealing and auxiliary beads, and recesses to provide levelling buttons. The gasket cover stock is compressed so that it is no higher than the raised bolt hole areas. The pressing and curing operations are similar to those described above and need no further explanation. The gasket may be formed with the relatively denser bushings in the bolt hole areas with the sealing function effected by the insulator body itself without the top and bottom gasket covers used for the purpose. As a further alternative the gasket core structure might be coated with an elastomeric type material that would provide the conformability required for sealing purposes.

These modifications as well as other embodiments and interchangeables will make themselves apparent to those working in this art, and such matters will not detract from the essence of the herein disclosed invention as measured by the appended claims.

While the hardened resin impregnated asbestos core and insert members have been discussed as having a $k$ factor of approximately 2 to 2.5, this has been merely by way of illustration and not as a limitation. Generally speaking a $k$ factor of less than about 3 is preferred to prevent heat transfer and build-up from the remainder of the engine in the sensitive carburetion area, but higher $k$ factors may be utilized if circumstance so indicate consistent with the invention and as long as the amount of heat conducted through the hardened part does not reach unacceptable levels in the carburetor area.

We claim:

1. The method of forming heat insulating gasket structures for installation between an automotive engine and a carburetor mounted thereon comprising:
    a. die-cutting a member from a sheet of heat insulating material to form a core;
    b. providing said core with tab-like portions, some of which have a bolt hole therethrough; and
    c. pressing the core only at the tab-like portions to densify and decrease the volume of the core at the tab-like portions, and
    d. applying a gasket layer to at least one side of the core having a density less than that of the core, said gasket structure being thus densified, prior to installation of the gasket structure between said engine and carburetor.

2. The method in accordance with claim 1 wherein extra gasket material is provided in the tab-like portion.
3. The method in accordance with claim 2 wherein a sealing bead is formed on the outer face of the layer.
4. The method in accordance with claim 1 wherein a partial insert member in the form of a washer is inserted.
5. The method in accordance with claim 4 wherein a sealing bead is formed on the outer face of the layer.
6. The method of forming a heat-insulating gasket structure and the like comprising:
    a. die-cutting from phenolic impregnated asbestos millboard duplicate core parts having a tab-like portion containing a bolt-hole;
    b. interposing between said parts in the area of said tab-like portion a relatively dense substantially non-compressible washer-like member having a bolt-hole therethrough in alignment with the bolt holes provided in said core parts;
    c. placing the said components in a heated pin mold provided with at least one cavity in alignment with and approximately the same configuration as said washer component;
    d. applying heat and pressure to said pin mold to force at least one of the core parts into the mold cavity due to the incompressibility of the washer component to provide the core with a protuberance in the area of said bolt hole; and
    e. curing the composite core.
7. The method in accordance with claim 6 wherein a gasket layer is applied to at least one side of the composite core member.
8. The method in accordance with claim 7 wherein a sealing bead is formed on the outer face of the gasket layer.
9. The method in accordance with claim 8 wherein an additional sealing bead is formed around the periphery of the gasket structure.
10. The method in accordance with claim 8 wherein peripheral buttons are formed from such gasket layer.
11. The method in accordance with claim 8 wherein said sealing bead and said protuberance in the bolt-hole area are above the surface of the gasket covering.
12. The method in accordance with claim 7 wherein said gasket layer is provided with an opening of similar diameter to the outside diameter of said washer-like member into which said protuberance is forced by the application of said heat and pressure.

* * * * *